(12) United States Patent
Mooring

(10) Patent No.: US 10,824,715 B2
(45) Date of Patent: Nov. 3, 2020

(54) SYSTEMS AND METHODS INVOLVING ASPECTS OF HARDWARE VIRTUALIZATION SUCH AS SEPARATION KERNEL HYPERVISORS, HYPERVISORS, HYPERVISOR GUEST CONTEXT, HYPERVISOR CONTEXT, ANTI-FINGERPRINTING, AND/OR OTHER FEATURES

(71) Applicant: LYNX SOFTWARE TECHNOLOGIES, INC., San Jose, CA (US)

(72) Inventor: Edward T. Mooring, Santa Clara, CA (US)

(73) Assignee: Lynx Software Technologies, Inc., San Jose, CA (US)

( * ) Notice: Subject to any disclaimer, the term of this patent is extended or adjusted under 35 U.S.C. 154(b) by 56 days.

(21) Appl. No.: 15/396,231

(22) Filed: Dec. 30, 2016

(65) Prior Publication Data

US 2017/0200005 A1    Jul. 13, 2017

Related U.S. Application Data

(63) Continuation of application No. PCT/US2015/038918, filed on Jul. 1, 2015.
(Continued)

(51) Int. Cl.
*G06F 21/00* (2013.01)
*G06F 21/53* (2013.01)
*G06F 9/455* (2018.01)

(52) U.S. Cl.
CPC .......... *G06F 21/53* (2013.01); *G06F 9/45558* (2013.01); *G06F 2009/45587* (2013.01)

(58) Field of Classification Search
CPC ............... G06F 21/75; G06F 21/14; G06F 2009/45587; G06F 21/50–53; G06F 9/45558
See application file for complete search history.

(56) References Cited

U.S. PATENT DOCUMENTS 6,049,316 A    4/2000  Nolan et al.
7,053,963 B2   4/2006  Neiger et al.
(Continued)

FOREIGN PATENT DOCUMENTS

JP    2010-049627    3/2010
RU    2259582        8/2005
(Continued)

OTHER PUBLICATIONS

Extended European Search Report received in EP application No. 17194400.2, dated Jul. 24, 2018, 9 pgs.
(Continued)

*Primary Examiner* — Joseph P Hirl
*Assistant Examiner* — Ka Shan Choy
(74) *Attorney, Agent, or Firm* — Greenberg Traurig, LLP

(57) ABSTRACT

Systems, methods, computer readable media and articles of manufacture consistent with innovations herein are directed to computer virtualization, computer security and/or hypervisor fingerprinting. According to some illustrative implementations, innovations herein may utilize and/or involve a separation kernel hypervisor which may include the use of a guest operating system virtual machine protection domain, a virtualization assistance layer, and/or a CPU ID instruction handler (which may be proximate in temporal and/or spatial locality to malicious code, but isolated from it). The CPU ID instruction handler may perform processing, inter alia, to return configurable values different from the actual values for the physical hardware. The virtualization assistance layer
(Continued)

may further contain virtual devices, which when probed by guest operating system code, return the same values as their physical counterparts. In addition, the virtualization assistance layer may vary its internal I/O and memory addresses in a configurable manner.

21 Claims, 8 Drawing Sheets

Related U.S. Application Data

(60) Provisional application No. 62/019,818, filed on Jul. 1, 2014.

(56) References Cited

U.S. PATENT DOCUMENTS

| | | |
|---|---|---|
| 7,845,009 B2 | 11/2010 | Grobman |
| 7,992,144 B1 | 8/2011 | Hendel |
| 8,056,076 B1 | 11/2011 | Hutchins et al. |
| 8,073,990 B1 | 12/2011 | Baron et al. |
| 8,141,163 B2 | 3/2012 | Pike |
| 8,200,796 B1 | 6/2012 | Margulis |
| 8,352,941 B1 | 1/2013 | Protopopoy et al. |
| 8,370,838 B1 | 2/2013 | Omelyanchuck et al. |
| 8,458,697 B2 | 6/2013 | Amano et al. |
| 8,473,627 B2 * | 6/2013 | Astete ............... G06F 9/45533 709/229 |
| 8,490,086 B1 | 7/2013 | Cook |
| 8,539,584 B2 | 9/2013 | Ramallingam |
| 8,549,643 B1 | 10/2013 | Shou |
| 8,584,211 B1 | 11/2013 | Vetter et al. |
| 8,745,745 B2 | 6/2014 | Mooring |
| 8,977,848 B1 | 3/2015 | Tomlinson |
| 9,021,559 B1 | 4/2015 | Vetter |
| 9,203,855 B1 | 12/2015 | Mooring |
| 9,218,489 B2 | 12/2015 | Mooring |
| 9,390,267 B2 | 7/2016 | Mooring |
| 9,607,151 B2 | 3/2017 | Mooring |
| 9,648,045 B2 | 5/2017 | Mooring |
| 9,703,444 B2 * | 7/2017 | Nicholson ............ G06F 3/0481 |
| 9,940,174 B2 | 4/2018 | Mooring et al. |
| 10,051,008 B2 | 8/2018 | Mooring et al. |
| 2002/0166059 A1 | 11/2002 | Rickey et al. |
| 2003/0093682 A1 | 5/2003 | Carmona et al. |
| 2004/0174352 A1 | 9/2004 | Wang |
| 2004/0177264 A1 | 9/2004 | Anson |
| 2004/0221009 A1 | 11/2004 | Cook et al. |
| 2005/0039180 A1 | 2/2005 | Fultheim et al. |
| 2005/0105608 A1 | 5/2005 | Coleman et al. |
| 2005/0210158 A1 | 9/2005 | Cowperthwaite |
| 2005/0216759 A1 | 9/2005 | Rothman et al. |
| 2005/0223238 A1 | 10/2005 | Schmid et al. |
| 2006/0184937 A1 | 8/2006 | Abels |
| 2007/0050764 A1 | 3/2007 | Traut |
| 2007/0057957 A1 | 3/2007 | Wooten |
| 2007/0089111 A1 | 4/2007 | Robinson et al. |
| 2007/0136506 A1 | 6/2007 | Traut |
| 2008/0016570 A1 | 1/2008 | Capalik |
| 2008/0126820 A1 | 5/2008 | Fraser et al. |
| 2008/0127336 A1 | 5/2008 | Sun et al. |
| 2008/0148048 A1 | 6/2008 | Govil |
| 2008/0215770 A1 | 9/2008 | Liu et al. |
| 2008/0263659 A1 | 10/2008 | Alme |
| 2008/0282117 A1 | 11/2008 | Partiani et al. |
| 2008/0320594 A1 | 12/2008 | Jiang |
| 2009/0099988 A1 | 4/2009 | Stokes et al. |
| 2009/0158432 A1 | 6/2009 | Zheng et al. |
| 2009/0204964 A1 | 8/2009 | Foley et al. |
| 2009/0254990 A1 | 10/2009 | McGee |
| 2009/0288167 A1 * | 11/2009 | Freericks ............ G06F 21/54 726/23 |
| 2009/0328225 A1 | 12/2009 | Chambers et al. |
| 2010/0027552 A1 | 2/2010 | Hill |
| 2010/0031325 A1 | 2/2010 | Maigne et al. |
| 2010/0077487 A1 | 3/2010 | Polyakov et al. |
| 2010/0146267 A1 | 6/2010 | Konetski |
| 2010/0328064 A1 | 12/2010 | Rogel |
| 2011/0047543 A1 | 2/2011 | Mohinder |
| 2011/0126139 A1 | 5/2011 | Jeong |
| 2011/0141124 A1 | 6/2011 | Halls |
| 2011/0145886 A1 | 6/2011 | McKenzie et al. |
| 2011/0145916 A1 | 6/2011 | McKenzie et al. |
| 2011/0161482 A1 | 6/2011 | Bonola et al. |
| 2011/0167422 A1 | 7/2011 | Eom et al. |
| 2011/0185063 A1 | 7/2011 | Head et al. |
| 2011/0225458 A1 | 9/2011 | Zuo et al. |
| 2011/0225655 A1 | 9/2011 | Niemela et al. |
| 2011/0307888 A1 | 12/2011 | Raj et al. |
| 2012/0035681 A1 | 2/2012 | Maximilien |
| 2012/0066680 A1 | 3/2012 | Amano et al. |
| 2012/0185913 A1 | 7/2012 | Martinez et al. |
| 2013/0024940 A1 | 1/2013 | Hutchins et al. |
| 2013/0097356 A1 | 4/2013 | Dang et al. |
| 2013/0312099 A1 | 11/2013 | Edwards et al. |
| 2013/0347131 A1 | 12/2013 | Mooring et al. |
| 2014/0059680 A1 | 2/2014 | Kurien et al. |
| 2014/0173600 A1 | 6/2014 | Ramakrishnan Nair |
| 2014/0380425 A1 | 12/2014 | Lockett |
| 2017/0068560 A1 | 3/2017 | Mooring et al. |

FOREIGN PATENT DOCUMENTS

| | | |
|---|---|---|
| WO | WO 2008/091452 | 7/2008 |
| WO | WO 2010/021631 | 2/2010 |
| WO | WO 2012/177464 | 12/2012 |
| WO | WO 2016/004263 | 1/2016 |

OTHER PUBLICATIONS

Dam et al., "Formal Verification of Information Flow Security for a Simple ARM-based Separation Kernel," ACM, Nov. 2013, pp. 223-234.

Day et al., "Secure Virtualization combines Traditional Desktop Oss and Embedded RTOSs in Military Embedded Systems", Military Embedded Systems, May 2010, 10 pgs. http://www.lynx.com/whitepaper/secure-virtualization-combines-traditional-desktop-oss-and-embedded-rtoss-in-military-embedded-systems/.

Day et al., "Virtualization: Keeping Embedded software Safe and Secure in an Unsafe World Secure Virtualization for Real-time, Linux and Windows Systems," EE Times, Jun. 2010, pp. 1-3 http://www.lynuxworks.com/virtualization/keeping-embedded-software-secure.php.

Day,Robert, "Hardware Virtualization Puts on a New Spin on Secure Systems", COTS Journal, http://www.lynuxworks.com/virtualization/virtualization-hardware.php, Oct. 2010, 6 pgs.

Delong et al. "Separation Kernel for a Secure Real-time Operating System," Jun. 2010, 5 pgs. http://web.archive.org/web/20100630223040/http://lynuxworks.com/products/whitepapers/separation-kenel.php.

Embedded computing design, "Advances in Virtualization Aid Information Assurance," Jan. 2008, pp. 1-8, http://embedded-computing.com/article-id/?2571.

Extended European Search Report of EP 13809599.7, dated Jun. 22, 2016, 10 pgs.

Hoffman et al., "User Mode Versus Privileged Mode Processor Usage," Sep. 2010, pp. 1-2, http://blogs.technet.com/b/perfguide/archive/2010/09/28/user-mode-versus-privileged-mode-processor-usage-aspx.

International Preliminary Report on Patentability for PCT/US2011/036553, dated Nov. 19, 2013 (1pg), including Written Opinion dated Dec. 26, 2011 (9 pgs), 10 pages total.

International Preliminary Report on Patentability for PCT/US2015/038918 dated Jan. 3, 2017, including Written Opinion dated Oct. 2, 2015; 11 pgs total.

International Search Report and Written Opinion dated for WO2012/177464 both dated Sep. 20, 2012, 12 pages total.

International Search Report and Written Opinion for PCT/US2015/031259, dated Oct. 7, 2015, 9 pgs.

(56) References Cited

OTHER PUBLICATIONS

International Search Report for PCT/US2011/036553 dated Dec. 26, 2011, 4 pgs.
Iqbal et al., "An Overview of Microkernel, Hypervisor and Microvisor Virtualization Approaches for Embedded Systems," Dec. 2010, 15 pgs., http://proj.eit.lth.se/fileadmin/eit/project/142/virtApproaches.pdf.
International Preliminary Report on Patentability for PCT/US15/031257, dated Nov. 15, 2016, 6 pgs.
International Preliminary Report on Patentability for PCT/US15/031259, dated Nov. 15, 2016, 7 pgs.
International Preliminary Report on Patentability for PCT/US2015/031236 dated Nov. 15, 2016, 6 pgs.
International Preliminary Report on Patentability dated Dec. 31, 2014 (1 pg) and International Search Report and Written Opinion dated Feb. 27, 2014 (15 pgs) in related PCT application No. PCT/US2013/048014, Invitation to Pay Additional Fees in related PCT/US2013/48014, dated Jan. 3, 2014, (2 pgs.) 18 pgs. total.
International Search Report and Written Opinion for PCT/US15/31236 dated Aug. 14, 2015, 9 pgs.
International Search Report and Written Opinion for PCT/US15/31257 dated Aug. 17, 2015, 9 pgs.
Lynuxworks, "Secure Client Virtualization Based on Military-grade Technology," May 2011, pp. 1-8, http://web.archive.org/web/20110310051907/http://lynuxworks.com/virtualization/secure-client-virtualization/php.
Prosecution of EPO appln No. EP13809599.7, including International Preliminary Report on Patentability and Search Report, dated Dec. 1, 2015 (16 pgs), Communication dated Feb. 13, 2015 (3 pgs) and Amendment dated Aug. 24, 2015 (29 pgs); 48 pgs total.
Prosecution of European counterpart application No. 12802824.8 (EP2718785), including IPRP dated Dec. 17, 2013 (8pgs.), Response to Rule 161/162 Communication dated Sep. 3, 2014 (14 pgs.), Supplementary Search report and opinion dated Nov. 27, 2014 (10 pgs.), Response to Supplementary Search Report/Opinion dated Jun. 26, 2015 (23 pgs.), 2nd Supplemental Office Action dated Oct. 8, 2015 (6 pgs.), and Response to the 2nd Supplemental Office Action dated Apr. 18, 2016 (11 pgs.); 72 pages total.
Yoon et al., "An Intelligence Virtualization Rule Based on Multi-layer to Support social-Media Cloud Service", 2011, First ACIS/JNU International conference on computers, Networks, Systems, and Industrial Engineering, pp. 210-215.
International Preliminary Report on Patentability for PCT/US2015/038918, dated Jan. 3, 2017, 11 pgs.
International Preliminary Report on Patentability for PCT/US2012/177464 (including the Written Opinion), dated Dec. 17, 2013, 8 pgs., and International Search Report, dated Dec. 27, 2012, 5 pgs.; 13 pages total.

\* cited by examiner

SYSTEMS AND METHODS INVOLVING ASPECTS OF HARDWARE VIRTUALIZATION SUCH AS SEPARATION KERNEL HYPERVISORS, HYPERVISORS, HYPERVISOR GUEST CONTEXT, HYPERVISOR CONTEXT, ANTI-FINGERPRINTING, AND/OR OTHER FEATURES

CROSS-REFERENCE TO RELATED APPLICATION INFORMATION

This application is a (bypass) continuation of PCT patent application No. PCT/US2015/038918, international filing date Jul. 1, 2015, published as WO2016/004263, which claims benefit/priority of provisional application No. 62/019,818, filed Jul. 1, 2014, all of which are incorporated herein by reference in entirety.

BACKGROUND

Field

Innovations herein pertain to computer software and hardware, computer virtualization, computer security and/or data isolation, and/or the use of a separation kernel hypervisor (and/or hypervisor), such as to process information including changes to a virtualized hardware environment presented to an operating system and/or to perform other processing regarding fingerprinting attempts by guest software, and which may include or involve guest operating system(s).

Description of Related Information

In computer systems with hypervisors supporting a guest operating system, there exist some means to monitor the guest operating system for malicious or errant activity.

In a virtualized environment, running under control of a hypervisor, a suitably authorized guest may be allowed to monitor the activities of another guest. Among the reasons for such monitoring are debugging and security. However, previous approaches may include various drawbacks, such as allowing guests or guest software to poll memory and other information in other guests or locations and/or attempt to determine if it is running under control of a particular hypervisor or perform other fingerprinting techniques.

However, due to the constantly evolving nature of malicious code, such systems face numerous limitations in their ability to detect and defeat malicious code. One major limitation is the inability of a hypervisor to defend itself against malicious code; e.g., the particular hypervisor may be subverted by malicious code and/or may allow malicious code in a guest operating system to proliferate between a plurality of guest operating systems in the system.

To solve that issue, the motivation and use of a Separation Kernel Hypervisor is introduced in environments with malicious code. The Separation Kernel Hypervisor, unlike a hypervisor, does not merely support a plurality of Virtual Machines (VMs), but supports more secure, more isolated mechanisms, including systems and mechanisms to monitor and defeat malicious code, where such mechanisms are isolated from the malicious code but are also have high temporal and spatial locality to the malicious code. For example, they are proximate to the malicious code, but incorruptible and unaffected by the malicious code.

Furthermore the Separation Kernel Hypervisor is designed and constructed from the ground-up, with security and isolation in mind, in order to provide security and certain isolation between a plurality of software entities (and their associated/assigned resources, e.g., devices, memory, etc.); by mechanisms which may include Guest Operating System Virtual Machine Protection Domains (secure entities established and maintained by a Separation Kernel Hypervisor to provide isolation in time and space between such entities, and subsets therein, which may include guest operating systems, Virtualization Assistance Layers ("VALs"), and VAL mechanisms); where such software entities (and their associated assigned resources, e.g., devices, memory, etc., are themselves isolated and protected from each other by the Separation Kernel Hypervisor, and/or its use of hardware platform virtualization mechanisms.

Additionally, where some hypervisors may provide mechanisms to communicate between the hypervisor and antivirus software, or monitoring agent, executing within a guest operating system (for purposes of attempting to monitor malicious code), the hypervisor is not able to prevent corruption of the monitoring agent where the agent is within the same guest operating system as the malicious code; or the guest operating system (or any subset thereof, possibly including the antivirus software, and/or monitoring agent) is corrupted and/or subverted.

With a Separation Kernel Hypervisor, one may use a defense-in-depth technique in order to provide a runtime execution environment whereby software can securely monitor for malicious code without being affected or corrupted by it; while at the same time having close proximity (in time and space) to the malicious code (or code, data, and/or resources under monitoring).

Finally, while some known systems and methods include implementations involving virtualized assistance layers and separation kernel hypervisors to handle various malicious code intrusions, such systems and method possess limitations and/or restrictions with regard to handling and/or intercepting certain specified attacks, such as those related to fingerprinting or other such probing code attempts.

Overview of Some Aspects

Systems, methods, computer readable media and articles of manufacture consistent with innovations herein are directed to computer virtualization, computer security and/or data isolation, and/or the use of a Separation Kernel Hypervisor (and/or hypervisor), such as by changing the virtualized hardware environment presented to an operating system to prevent attempts to determine if it is running under control of a particular hypervisor or performing other such fingerprinting techniques. Here, for example, certain implementations may involve a suitably authorized guest running under control of a hypervisor and involving features of changing the virtualized hardware environment presented to an operating system in various ways.

According to some illustrative implementations, innovations herein may utilize and/or involve a separation kernel hypervisor which may include the use of a guest operating system virtual machine protection domain, a virtualization assistance layer, and/or various VAL subcomponents or mechanisms (which may be proximate in temporal and/or spatial locality to malicious code, but isolated from it), inter alia, for varying locations, sizes, results, etc. of various resources or information accessed, queried, or otherwise processed via an operating system or software associated with a guest.

It is to be understood that both the foregoing general description and the following detailed description are exemplary and explanatory only and are not restrictive of the inventions, as described. Further features and/or variations may be provided in addition to those set forth herein. For example, the present inventions may be directed to various combinations and subcombinations of the disclosed features and/or combinations and subcombinations of several further features disclosed below in the detailed description.

BRIEF DESCRIPTION OF THE DRAWINGS

The accompanying drawings, which constitute a part of this specification, illustrate various implementations and features of the present innovations and, together with the description, explain aspects of the inventions herein. In the drawings.

DETAILED DESCRIPTION OF ILLUSTRATIVE IMPLEMENTATIONS

Figure 1:
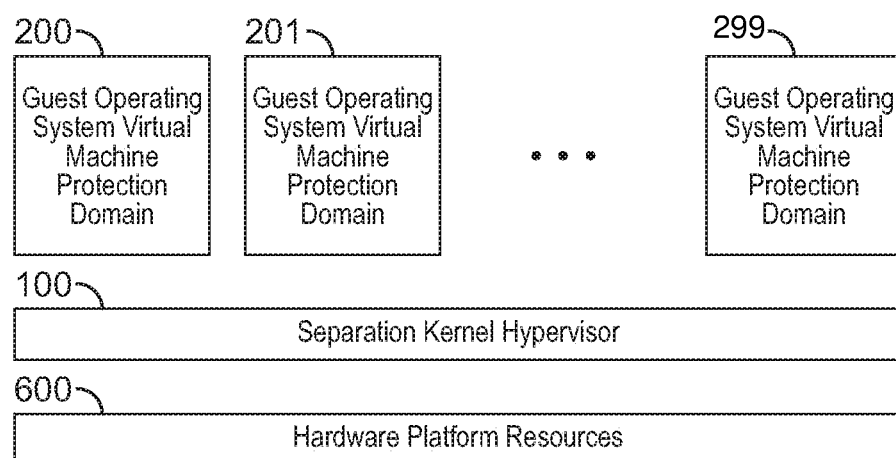
FIG. 1 is a block diagram illustrating an exemplary system and Separation Kernel Hypervisor architecture consistent with certain aspects related to the innovations herein.

Reference will now be made in detail to the inventions herein, examples of which are illustrated in the accompanying drawings. The implementations set forth in the following description do not represent all implementations consistent with the inventions herein. Instead, they are merely some examples consistent with certain aspects related to the present innovations. Wherever possible, the same reference numbers are used throughout the drawings to refer to the same or like parts.

To solve one or more of the shortcomings mentioned above and/or other drawbacks, implementations herein may relate to various processing and/or fingerprint prevention techniques, systems, and mechanisms, as may be used with a separation kernel hypervisor. Among other things, such systems and methods may include and/or involve the use of the monitoring and/or changing of the entirety, or suitably configured subset thereof of guest operating system resources including virtualized resources such as the hardware environment and/or "physical" or "pass-through" resources. Examples include changing the virtualized hardware environment presented to an operating system in various ways to prevent attempts to determine if the operating system is running under control (e.g., of a particular hypervisor) via examination of the hardware environment presented to it.

With regard to certain implementations, in order to perform such advanced fingerprint prevention in a manner that maintains suitable performance characteristics in a system that may include a separation kernel hypervisor and a guest operating system, mechanisms such as a separation kernel hypervisor, a guest operating system virtual machine protection domain, virtual machine assistance layer, and/or virtual hardware presentation mechanisms, may be utilized to perform the processing herein on a corresponding guest operating system.

Systems and methods are disclosed for varying and/or changing various virtualized hardware environment aspects presented to an operating system and/or guest software and which may include or involve guest operating system(s). According to some implementations, for example, locations, sizes, results, etc. of various resources or information accessed, queried, or otherwise presented unmodified to an operating system or software associated with a guest may be changed and/or varied. Here, such processing may also be performed in a timely and expeditious fashion, including by virtue of the modified context being proximate (in time and space) to any unmodified context. Additionally, isolation may be maintained between the operating system and the mechanisms presenting the modified context(s). Further, such processing may be performed by mechanisms providing a wide and comprehensive set of techniques and resources to an operating system, inter alia, so as to prevent fingerprinting attempts which are multi-lateral and/or multi-dimensional in nature.

According to some implementations, for example, one or more mechanisms within or associated with the VAL may be configured to return results similar to physical hardware devices for configuration queries to virtual devices of the virtualized hardware environment. These mechanisms may be utilized when a monitored guest issues configuration queries regarding devices of the virtualized hardware environment. When software in the monitored guest attempts to issue such queries, control goes to the VAL. Then, the present mechanisms may be implemented to return results similar to those that would be returned for physical hardware devices, for configuration queries to or regarding corresponding virtual devices.

According to some or other implementations, one or more VAL mechanisms may be configured to vary the location(s) of non-standard, private I/O devices at guest startup time. Here, for example, an operating system of a monitored guest may perform various fingerprinting operations, such as those directed to querying the location(s) of non-standard, private I/O devices. When software in the monitored guest attempts to issue such queries, control goes to the VAL. Then, the present mechanisms may be implemented to return results wherein the location(s) of non-standard, private I/O devices that are presented to the operating system are varied. Such location information may be varied to cloak information normally revealed by such queries, which may be utilized by operating systems in certain circumstances to determine when the guest is being monitored or under external control.

According to some or other implementations, one or more VAL mechanisms may be configured to vary the location(s) and/or size(s) of non-standard, private memory areas at guest startup time. Here, for example, an operating system on a monitored guest may perform various fingerprinting operations, such as those directed to querying the location(s) and/or size(s) of non-standard, private memory areas. When software in the monitored guest attempts to issue such queries, control goes to the VAL. Then, the present mechanisms may be implemented to return results wherein the location(s) and/or size(s) of non-standard, private memory areas are varied. As with above, such information may be varied to cloak the information normally revealed by such queries, responses to which may e.g. reveal hypervisor monitoring software.

According to some or other implementations, one or more mechanisms within or associated with the VAL may be configured to vary the results of execution of CPU identification instructions in the purportedly queried (physical/actual) processor. These mechanisms may be utilized, for example, when a monitored guest executes or issues queries including/regarding CPU identification instructions. When software in the monitored guest issues such instructions, control goes to the VAL. Then, the present mechanisms may be implemented to return varied results of the responses to the CPU identification instructions in the processor according to configuration data for the hypervisor.

Systems and methods are disclosed for providing secure operating system and information monitoring. According to some implementations, for example, such operating system and information monitoring may be provided from a context not able to be bypassed, tampered with or corrupted by the context under monitoring. Here, monitoring may also be performed in a timely and expeditious fashion, including by virtue of the monitoring context being proximate (in time and space) to the monitored context. Additionally, isolation may be maintained between the monitoring and monitored context. Further, such monitoring may be performed by mechanisms providing a wide and comprehensive set of monitoring techniques and resources under monitoring, inter alia, so as to monitor against threats which are multi-lateral and/or multi-dimensional in nature.

Moreover, systems and methods herein may include and/or involve a virtual machine which is augmented to form a more secure virtual representation (virtualized hardware environment) of the native hardware platform for a particular execution context. And such implementations may also include a virtual representation which is augmented with a wide and deep variety of built-in detection, notification(s) and monitoring mechanisms, and wherein secure isolation between the domains or virtual machines is maintained.

In general, aspects of the present innovations may include, relate to, and/or involve one or more of the following aspects, features and/or functionality. Systems and methods herein may include or involve a separation kernel hypervisor. According to some implementations, a software entity in hypervisor context that partitions the native hardware platform resources, in time and space, in an isolated and secure fashion may be utilized. Here, for example, embodiments may be configured for partitioning/isolation as between a plurality of guest operating system virtual machine protection domains, e.g., entities in a hypervisor guest context.

The separation kernel hypervisor may host a plurality of guest operating system virtual machine protection domains and may host a plurality of VAL mechanisms such as virtual hardware presentation mechanisms which may execute within such guest operating system virtual machine protection domains. These VAL mechanisms may execute in an environment where guest operating systems cannot tamper with, bypass, or corrupt the mechanisms. The VAL mechanisms may also execute to increase temporal and spatial locality of the guest operating system's resources. Further, in some implementations, the VAL mechanisms may execute in a manner that is not interfered with, nor able to be interfered with, nor corrupted by other guest operating system virtual machine protection domains including their corresponding guest operating systems. The VAL mechanisms include, but are not limited to, performing one or more of the following exemplary actions on guest operating systems, including returning results similar to physical hardware results for configuration queries to virtual devices, varying the location(s) of non-standard, private I/O devices at guest startup time, varying the location(s) and/or size(s) of non-standard private memory areas at guest startup time, varying the results of information provided regarding execution of CPU identification instructions in the processor according to configuration data for the hypervisor, etc.

Where such processing may further include, though is not limited to, actions pertaining to observation, detection, mitigation, prevention, tracking, modification, reporting upon, device access within or by a guest operating system, etc., and/or by entities configured to perform such functions.

FIG. 1 is a block diagram illustrating an exemplary system and separation kernel hypervisor architecture consistent with certain aspects related to the innovations herein. FIG. 1 also shows a separation kernel hypervisor executing on native hardware platform resources, e.g., where the separation kernel hypervisor may support the execution, isolated and partitioned in time and space, between a plurality of guest operating system protection domains. Here, a guest operating system domain may be an entity that is established and maintained by the separation kernel hypervisor in order to provide a secure and isolated execution environment for software. Referring to FIG. 1, a separation kernel hypervisor 100 is shown executing on top of the native hardware platform resources 600. Further, the separation kernel hypervisor 100 supports the execution of a guest operating system virtual machine protection domain 200.

The separation kernel hypervisor 100 may also support the execution of a plurality of guest operating system virtual machine protection domains, e.g., 200 to 299 in FIG. 1. In some implementations, the separation kernel hypervisor may provide time and space partitioning in a secure and isolated manner for a plurality of guest operating system virtual machine protection domains, e.g., 200 to 299 in FIG. 1. Such features may include rigid guarantees on scheduling resources, execution time, latency requirements, and/or resource access quotas for such domains.

According to some implementations, in terms of the sequence of establishment, after the native hardware platform resources 600 boot the system, execution is transitioned to the separation kernel hypervisor 100. The separation kernel hypervisor 100 then creates and executes a guest operating system virtual machine protection domain 200, or a plurality of guest operating system virtual machine protection domains, e.g., 200 to 299 in FIG. 1. Some implementations of doing so consonant with the innovations herein are set forth in PCT Application No. PCT/2012/042330, filed 13 Jun. 2012, published as WO2012/177464A1, and U.S. patent application Ser. No. 13/576,155, filed Dec. 12, 2013, published as US2014/0208442A1, which are incorporated herein by reference in entirety.

Consistent with aspects of the present implementations, it is within a guest operating system virtual machine protection domain that a guest operating system may execute. Further, it is within a guest operating system virtual machine protection domain that VAL mechanisms may also execute, e.g., in a fashion isolated from any guest operating system which may also execute within that same guest operating system virtual machine protection domain, or in other guest operating system virtual machine protection domains.

Figure 2A:
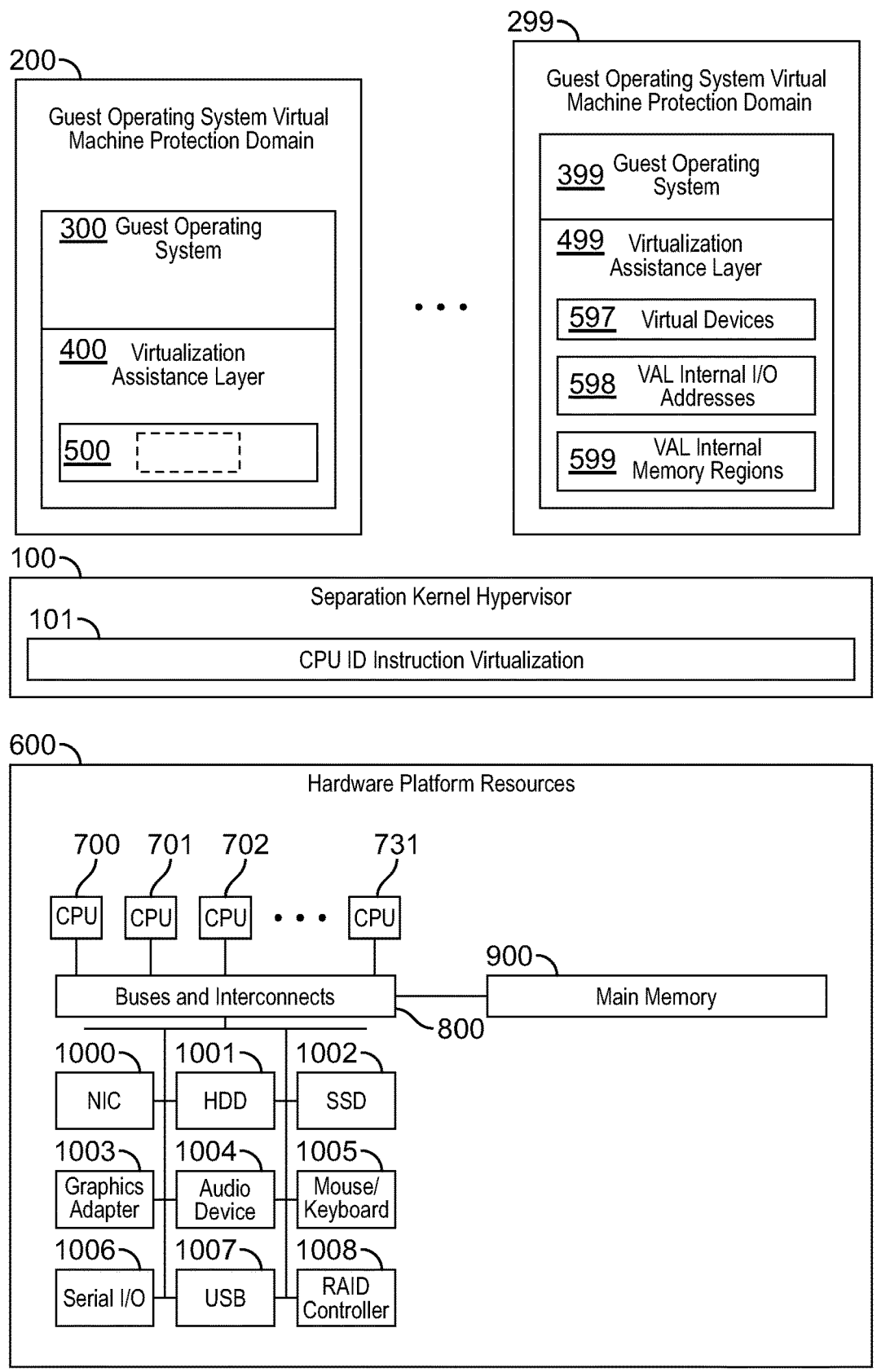
FIG. 2A is a block diagram illustrating an exemplary system and Separation Kernel Hypervisor architecture consistent with certain aspects related to the innovations herein.

FIG. 2A is a block diagram illustrating an exemplary system and separation kernel hypervisor architecture consistent with certain aspects related to the innovations herein. FIG. 2A also shows a separation kernel hypervisor 100 executing on native hardware platform resources (where the native platform resources may include a plurality of CPUs 700 through 731, buses and interconnects 800, main memory 900, Network Interface Cards (NIC) 1000, Hard Disk Drives (HDD) 1001, Solid State Drives (SSD) 1002, Graphics Adaptors 1003, Audio Devices 1004, Mouse/Keyboard/Pointing Devices 1005, Serial I/O 1006, USB 1007, and/or Raid Controllers 1008, etc.), where the separation kernel hypervisor may support the execution, isolated and/or partitioning in time and space, between a plurality of guest operating system protection domains. Here, some implementations may involve a guest operating system protection domains which may contain a guest operating system, and/or a virtualization assistance layer 400 or 499 (which, themselves, may contain VAL mechanisms, 500, or 597. 598, 599, respectively). Further, the separation kernel hypervisor 100 may include, access and/or involve various CPU identification instruction virtualization mechanisms, provided for the purpose of varying results returned to a monitored guest responsive to queries or other requests for CPU identification instructions. Here, for example, such mechanism may include reporting a CPU model, stepping, clock speed, or other configuration information that is configurable, rather than reporting a single, unchanging value, or the actual value from the physical CPU. Moreover, while the separation kernel hypervisors shown in the later drawings of the present inventions do not explicitly show this subcomponent, it is hereby noted that such implementations may include, access or otherwise involve such subcomponent or mechanisms, as well.

FIG. 2A shows both a guest operating system 300, and a virtualization assistance layer 400 executing within the same guest operating system virtual machine protection domain 200. In some implementations, the virtualization assistance layer 400 may provide the execution environment for the memory access VAL mechanisms 500 (also 597, 598, 599; hereinafter, together, "VAL mechanisms"). Further, the virtualization assistance layer 400 may assist the separation kernel hypervisor in virtualizing portions of the platform resources exported to a given guest operating system (e.g., Virtual CPU/ABI, Virtual chipset ABI, set of virtual devices, set of physical devices, and/or firmware, etc., assigned to a given guest operating system 300 and/or guest virtual machine protection domain 200). Some systems and methods herein utilizing such virtualization assistance layer may include or involve (but are not strictly limited to) a self-assisted virtualization component, e.g., with an illustrative implementation shown in FIG. 2B.

Further, a monitored guest operating system 300 may include guest operating system virtualization probing code (discussed in more detail in connection with FIG. 8, below) that may be malicious code installed for purposes of fingerprinting or otherwise probing or determining if the operating system is running under control of a particular hypervisor by examining the hardware environment presented to it.

The guest operating system 300 and the virtualization assistance layer 400 (which may include VAL mechanism(s) 500) are isolated from each other by the separation kernel hypervisor 100. In implementations herein, the guest operating system 300 cannot tamper with, bypass, or corrupt the virtualization assistance layer 400, nor can it tamper with, bypass or corrupt the VAL mechanisms 500. Since the VAL mechanisms 500 are isolated from the guest operating system 300, the VAL mechanisms 500 are able to act on a portion of (or the entirety, depending on policy and configuration) of the guest operating system 300 and its assigned resources in a manner that is (a) is transparent to the guest operating system 300 and (b) not able to be tampered with by the guest operating system 300 or its assigned resources (e.g., errant and/or malicious device DMA originated by devices assigned to the guest operating system 300), and (c) not able to be bypassed by the guest operating system 300. For example, the VAL mechanisms 500, within the given virtualization assistance layer 400, may read and/or modify portions of the guest operating system 300 and resources to which the Guest Operating System 300 has been granted access (by the Separation Kernel Hypervisor 100), while none of the Guest Operating System 300 nor the resources to which has access may modify any portion of the VAL mechanisms 500 and/or virtualization assistance layer 400.

By having a given virtualization assistance layer 400 and a given Guest Operating System 300 within the within the same Guest Virtual Machine Protection Domain 200, isolated from each other by the Separation Kernel Hypervisor 100, various benefits, non-penalties, or mitigation of penalties, such as the following, may be conferred to the system at large and to the VAL mechanisms 500.

Increased Spatial and Temporal Locality of Data

By being contained within the same Guest Virtual Machine Protection Domain 300, the virtualization assistance layer 200, and/or corresponding private (local) VAL mechanisms 500 existing in that same Guest Virtual Machine Protection Domain 200, have greater access, such as in time and space, to the resources of the Guest Operating System 300 than would entities in other guest virtual machine protection domains or other Guest Operating Systems; e.g., the subject guest virtual machine protection domain has faster responsiveness and/or has lower latency than if processed in another guest virtual machine protection domain. Though such resources are still accessed in a manner that is ultimately constrained by the Separation Kernel Hypervisor 100, there is less indirection and time/latency consumed in accessing the resources.

In one illustrative case, the VAL mechanisms 500 private (local) to a given Guest virtualization assistance layer 400 and its associated Guest Operating System 300 can react faster to physical memory access issues, and not need to wait on actions from another entity in another guest virtual machine protection domain 200 or guest operating system 300 (which may themselves have high latency, be corrupted, unavailable, poorly scheduled, or subject to a lack of determinism and/or resource constraint, or improper policy configuration, etc.).

Here, for example, if a Guest Operating System 300 was to monitor a Guest Operating System 399 located within another Guest Virtual Machine Protection Domain 299, it would encounter penalties in time and space for accessing that Guest Operating System and its resources; furthermore, there is increased code, data, scheduling, and/or security policy complexity to establish and maintain such a more complex system; such increases in complexity and resources allow for more bugs in the implementation, configuration, and/or security policy establishment and maintenance.

Scalability and Parallelism

Each Guest Operating System 300 may have a virtualization assistance layer 200, and VAL mechanisms 500, that are private (local) to the Guest Virtual Machine Protection Domain 200 that contains both that Guest Operating System 300, the virtualization assistance layer 400, and the VAL mechanisms.

Fault Isolation, Low Level of Privilege, Defense in Depth, Locality of Security Policy, and Constraint of Resource Access Here, for example, relative to the extremely high level of privilege of the separation kernel hypervisor 100, the virtualization assistance layer 400, the VAL mechanism 500, and the Guest Operating System 300 within the same Guest Virtual Machine Protection Domain 200 are only able to act on portions of that Guest Virtual Machine Protection Domain 200 (subject to the Separation Kernel Hypervisor 100) and not portions of other Guest Virtual Machine Protection Domains (nor their contained or assigned resources).

Subject to the isolation guarantees provided by the Separation Kernel Hypervisor 100, the virtualization assistance layer 400 accesses only the resources of the Guest Operating System 300 within the same Guest Virtual Machine Protection Domain 200 and that virtualization assistance layer 400 is not able to access the resources of other Guest Operating Systems.

As such, if there is corruption (bugs, programmatic errors, malicious code, code and/or data corruption, or other faults, etc.) within a given Guest Virtual Machine Protection Domain 200 they are isolated to that Guest Virtual Machine Protection Domain 200. They do not affect other Guest Virtual Machine Protection Domains 299 nor do they affect the Separation Kernel Hypervisor 100. This allows the Separation Kernel Hypervisor to act upon (e.g., instantiate, maintain, monitor, create/destroy, suspend, restart, refresh, backup/restore, patch/fix, import/export etc.) a plurality of Guest Virtual Machine Protection Domains 200 and their corresponding virtualization assistance layer 400 and VAL mechanisms 500 (or even Guest Operating Systems 300) without corruption of the most privileged execution context of the system, the Separation Kernel Hypervisor 100.

Similarly, the faults that may occur within a virtualization assistance layer 400 or the VAL mechanisms 500 (e.g., by corruption of software during delivery) are contained to the Guest Virtual Machine Protection Domain 200 and do not corrupt any other Guest Virtual Machine Protection Domain; nor do they corrupt the Separation Kernel Hypervisor 100.

Furthermore, the faults within a Guest Operating System 300 are contained to that Guest Operating System 300, and do not corrupt either the virtualization assistance layer 400 or the VAL mechanisms 500.

Figure 2B:
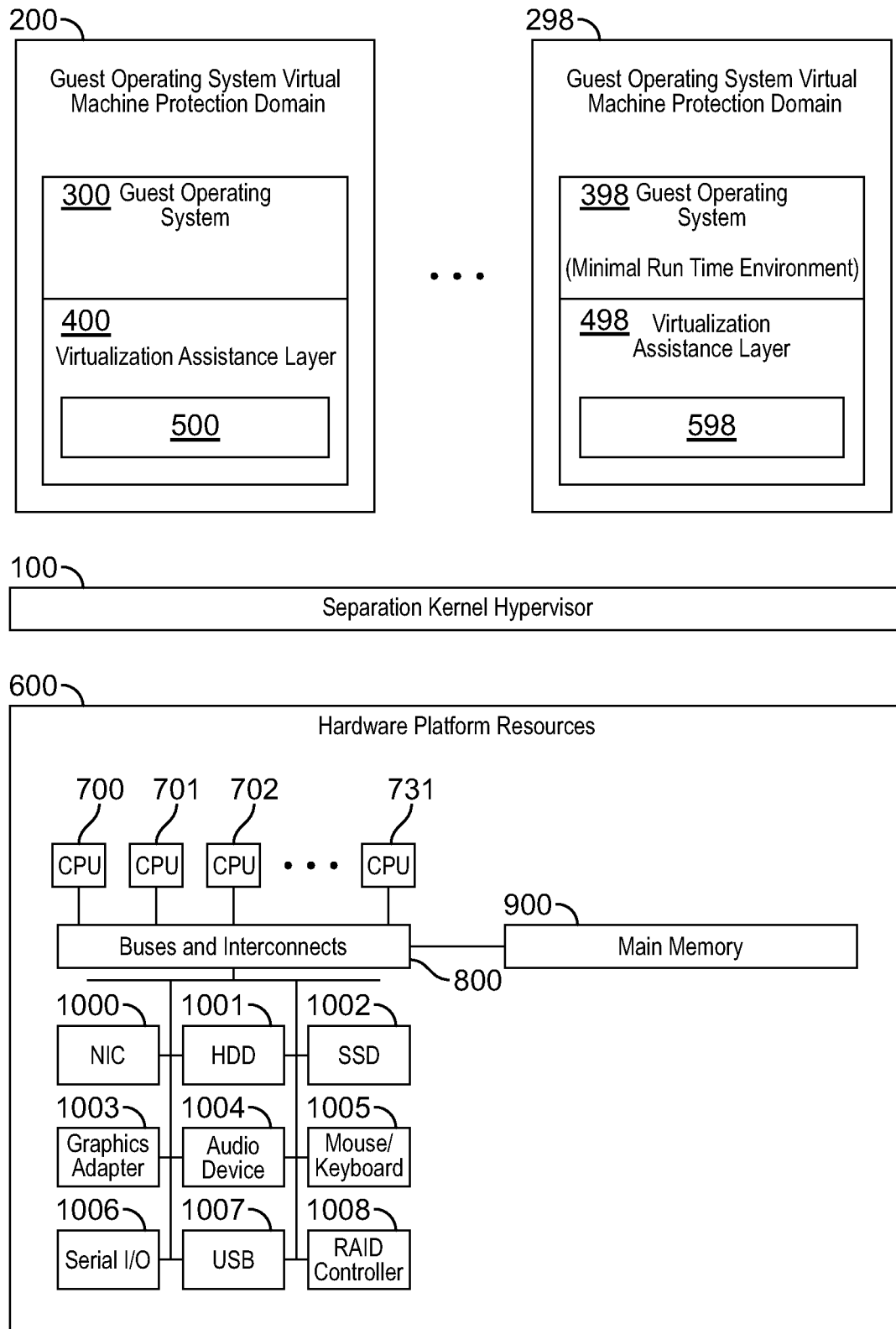
FIG. 2B is a block diagram illustrating an exemplary system and Separation Kernel Hypervisor architecture consistent with certain aspects related to the innovations herein.

FIG. 2B is a block diagram illustrating an exemplary system and separation kernel hypervisor architecture consistent with certain aspects related to the innovations herein. FIG. 2B illustrates a variation of FIG. 2A where a minimal runtime environment 398 executes in place of a (larger/more complex) guest operating system, within the virtual machine protection domain 298. Here, a minimal runtime environment may be an environment such as a VDS (virtual device server), and/or a LSA (LynxSecure application), etc. The minimal runtime environment 398 can be used for policy enforcement related to activities reported by a virtualization assistance layer and/or instruction execution detection/interception mechanisms; such an environment is also monitored by a virtualization assistance layer and/or instruction execution detection/interception mechanisms private to the guest operating system virtual machine protection domain containing the minimal runtime environment. Various virtual resources or subcomponents 598 belong and are private to the VAL 498 of the guest operating system 398, and are protected from and invisible to the guest. In one specific implementation, such virtual resources 598 may include one or more of virtual devices 597, VAL internal I/O addresses 598, and/or VAL internal memory regions 599.

Figure 3:
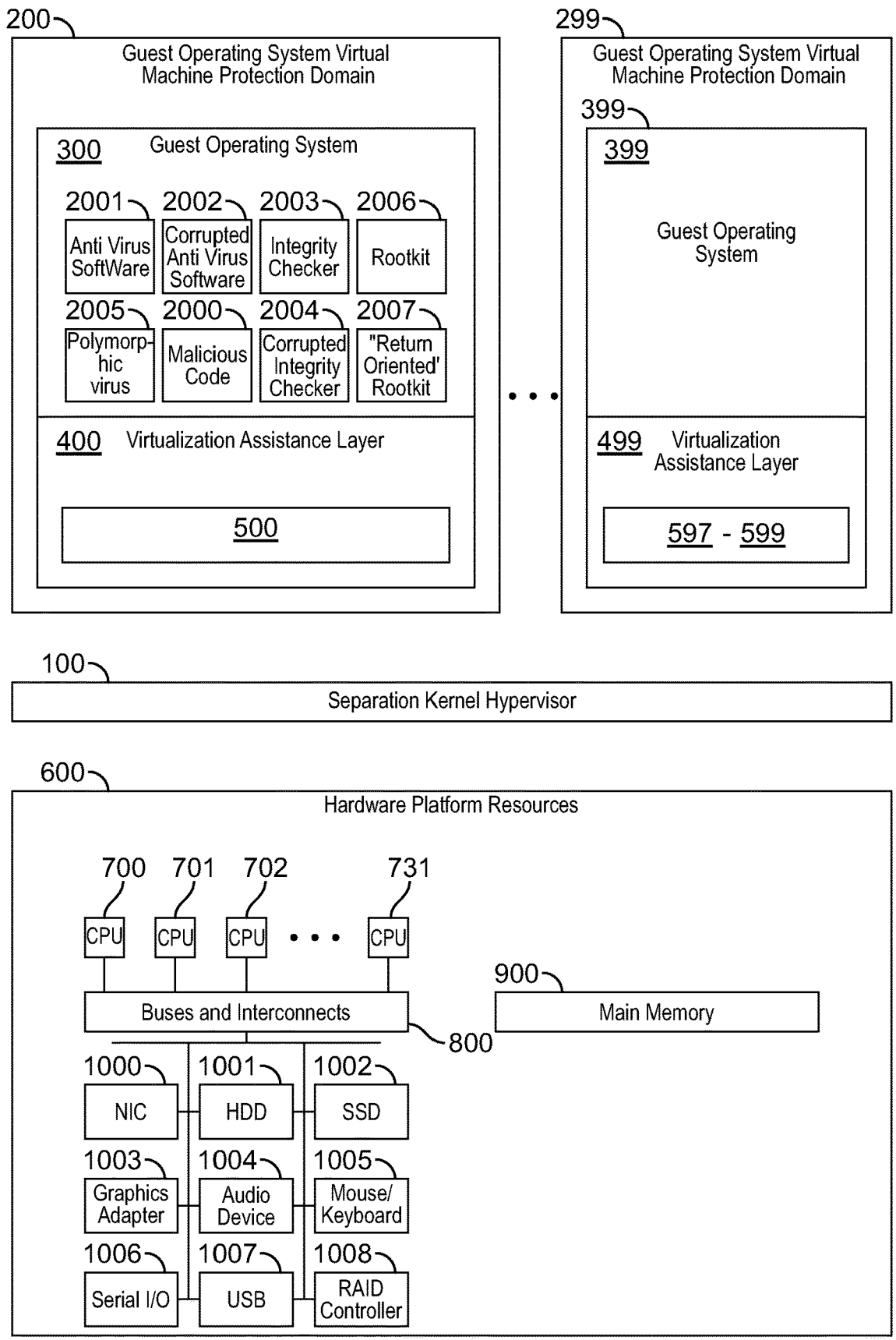
FIG. 3 is a block diagram illustrating an exemplary system and separation kernel Hypervisor architecture consistent with certain aspects related to the innovations herein.

FIG. 3 is a block diagram illustrating an exemplary system and separation kernel Hypervisor architecture consistent with certain aspects related to the innovations herein. FIG. 3 also shows certain detailed aspects with respect to FIG. 2A etc, where the guest operating system may attempt to query devices or resources such as by including a plurality of code and/or data which may constitute execution contexts which may include the following types of software including any/all of which malicious code may attempt to corrupt or utilize: malicious code, anti-virus software, corrupted anti-virus software, integrity checkers, corrupted integrity checkers, rootkits, return oriented rootkits, etc. The invention is not limited to memory access attempts by malicious code and is discussed below via illustrative examples.

For example, in FIG. 3, if antivirus software 2001 executes within a given guest operating system 300, and such anti-virus software 2001 is itself corrupted, and itself executes malicious code 2002 or fails to prevent the execution of malicious code 2002, the corruption is constrained to the given guest operating system 300, and the corruption may be acted upon (e.g., detected, notified, prevented, mitigated, reported, tracked, modified/patched, suspended, halted, restarted, eradicated, etc.) by mechanisms such as detection mechanisms (not shown) within the VAL or via VAL mechanisms 500 that involve virtual hardware presentation features, and is provided within the same guest virtual machine protection domain 200 as the guest operating system 300.

With regard to other exemplary implementations, as may be appreciated in connection with FIG. 3, if an integrity checker 2003 (e.g., a "security" component or driver within a guest operating system 300) executes within a given guest operating system 300, and such integrity checker 2003 is itself corrupted into a corrupted integrity checker 2004 (and executes malicious code, or fails to prevent the execution of malicious code), the corruption is constrained to the given guest operating system 300, and the corruption may be acted upon (e.g., detected, notified, prevented, mitigated, reported, tracked, modified/patched, suspended, halted, restarted, eradicated, etc.) by various mechanisms within the VAL.

With regard to another illustration, again with reference to FIG. 3, if a rootkit 2006 executes within the guest operating system 300 (e.g., by having fooled the Integrity Checker 2003 by the nature of the root kit being a return oriented rootkit 2007, which are designed specifically to defeat integrity checkers) the corruption is constrained to the given guest operating system 300, and the corruption may be acted upon (e.g., detected, notified, prevented, mitigated, reported, tracked, modified/patched, suspended, halted, restarted, eradicated, etc.) by mechanisms such as detection mechanisms (not shown) within the VAL or via VAL mechanisms 500 that involve virtual hardware presentation features, and is provided within the same guest virtual machine protection domain 200 as the guest operating system 300.

In another example, again with respect to FIG. 3, if a polymorphic virus 2005 (an entity designed to defeat integrity checkers, among other things) executes within the guest operating system 300 (e.g., by having fooled the integrity checker 2003, or by having the a corrupted integrity checker 2003) the corruption is constrained to the given guest operating system 300, and the corruption may be acted upon (e.g., detected, notified, prevented, mitigated, reported, tracked, modified/patched, suspended, halted, restarted, eradicated, etc.) by mechanisms such as detection mechanisms (not shown) within the VAL or via VAL mechanisms 500 that involve virtual hardware presentation features, and is provided within the same guest virtual machine protection domain 200 as the guest operating system 300.

In general, referring to FIG. 3, if a malicious code 2000 executes within the guest operating system 300 (e.g., by means including, but not limited strictly to bugs, defects, bad patches, code and/or data corruption, failed integrity checkers, poor security policy, root kits, viruses, trojans, polymorphic viruses, and/or other attack vectors and/or sources of instability within the guest operating system 300 etc.), the corruption is constrained to the given guest operating system 300, and the corruption may be acted upon (e.g., detected, notified, prevented, mitigated, reported, tracked, modified/patched, suspended, halted, restarted, eradicated, etc.) by mechanisms such as detection mechanisms (not shown) within the VAL or via VAL mechanisms 500 that involve virtual hardware presentation features, and is provided within the same guest virtual machine protection domain 200 as the guest operating system 300.

Furthermore, in the examples above and other cases, such corruption of the guest operating system 300, and the resources to which it has access, do not corrupt the VAL mechanisms 500 or other mechanisms within the VAL, the virtualization assistance layer 400, the guest virtual machine protection domain 200, or plurality of other such resources in the system (e.g., other guest virtual machine protection domains 299), or the separation kernel hypervisor 100.

In some implementations, the VAL mechanisms 500, in conjunction with the virtualization assistance layer 400, and the separation kernel hypervisor 100, may utilize various methods and mechanisms such as the following, given by way of illustration and example but not limitation, to act with and upon its associated guest operating system 300 the resources assigned to the guest operating system 300, and the systems behavior generated thereto and/or thereby.

Figure 4:
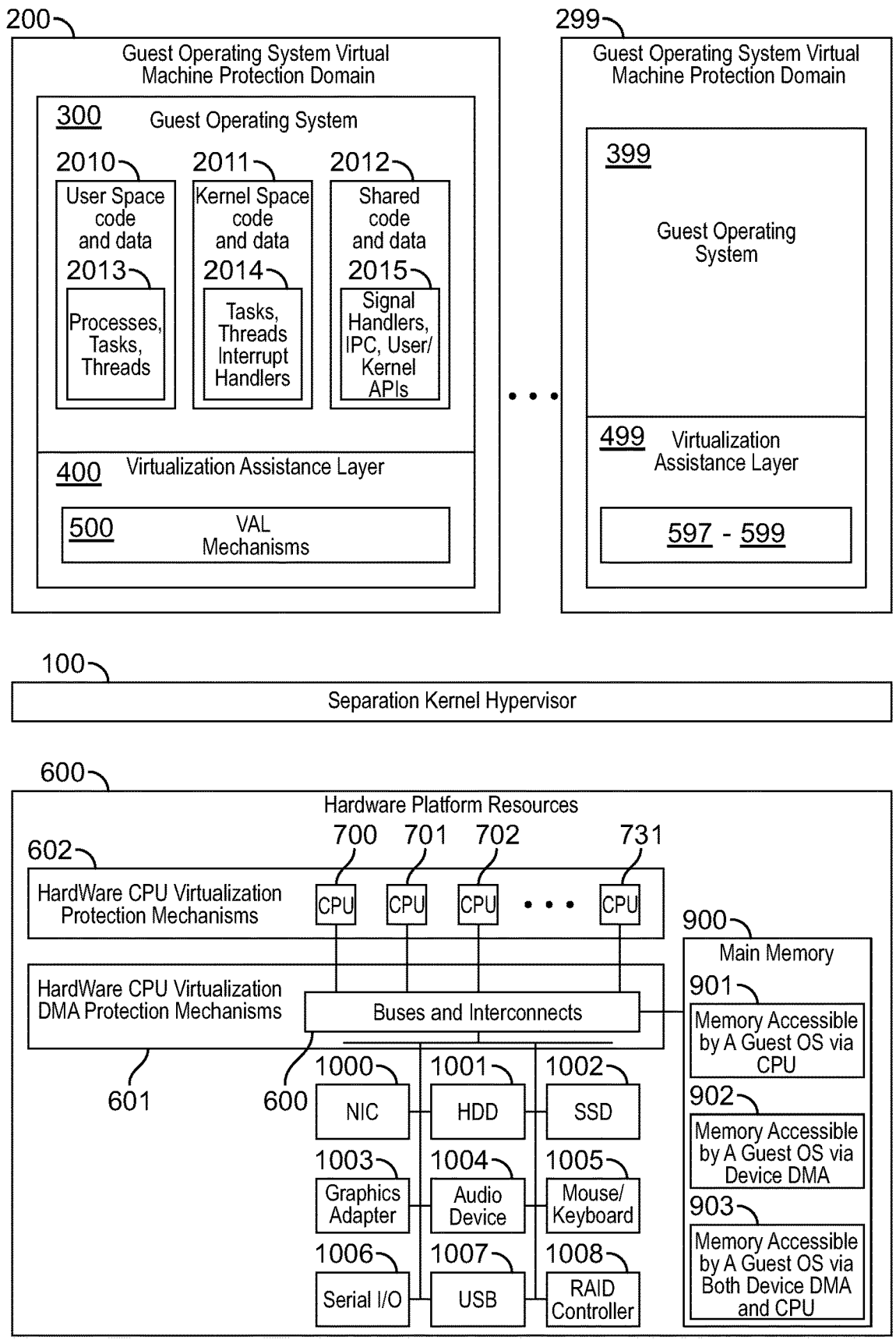
FIG. 4 is a block diagram illustrating an exemplary system and separation kernel hypervisor architecture consistent with certain aspects related to the innovations herein.

FIG. 4 is a block diagram illustrating an exemplary system and separation kernel hypervisor architecture consistent with certain aspects related to the innovations herein. For example, FIG. 4 illustrates resources that may be assigned to a Guest Operating System 300 consistent with certain aspects related to the innovations herein.

FIG. 4 shows an illustrative extension of either FIG. 2, and/or FIG. 3, where the guest operating system may have a plurality of code and/or data which may constitute execution contexts which may include the following types of software mechanisms and/or constructs user space code and data that may be associated with an unprivileged mode of CPU Malware execution (as used herein 'user space' being an execution environment of low privilege, versus an execution environment of high privilege, such as kernel space), which may contain processes, tasks, and/or threads, etc.; kernel space code and data, that may be associated with a privileged mode of CPU execution, which may contain tasks, threads, interrupt handlers, drivers, etc.; shared code and data, that may be associated with either privileged and/or unprivileged modes of CPU execution, and which may include signal handlers, Inter Process Communication Mechanisms (IPC), and/or user/kernel mode APIs. It also may include main memory that may be accessed by the CPU, by DMA from devices, or both. It also shows protection mechanisms including hardware CPU virtualization protection mechanisms, and hardware virtualization DMA protection mechanisms. Further, VAL mechanisms 500, 597, 598, 599 may reside within corresponding Virtualization Assistance Layers 400, 499

Such resources, explained here by way of example, not limitation, may include a subset of (a) hardware platform resources 600, virtualized hardware platform resources (hardware platform resources 600 subject to further constraint by the separation kernel hypervisor 100, the hardware CPU virtualization protection mechanisms 602, and/or the hardware virtualization DMA protection mechanisms 601), and execution time on a CPU 700 (or a plurality of CPUs, e.g., 700 to 731) (scheduling time provided by the separation kernel hypervisor 100), and space (memory 900 provided by the separation kernel hypervisor) within which the guest operating system 300 may instantiate and utilize constructs of the particular guest operating system 300, such as a privileged ("kernel" space) modes of execution, non-privileged ("user" space) modes of execution, code and data for each such mode of execution (e.g., processes, tasks, threads, interrupt handlers, drivers, signal handlers, inter process communication mechanisms, shared memory, shared APIs between such entities/contexts/modes, etc.

Figure 5:
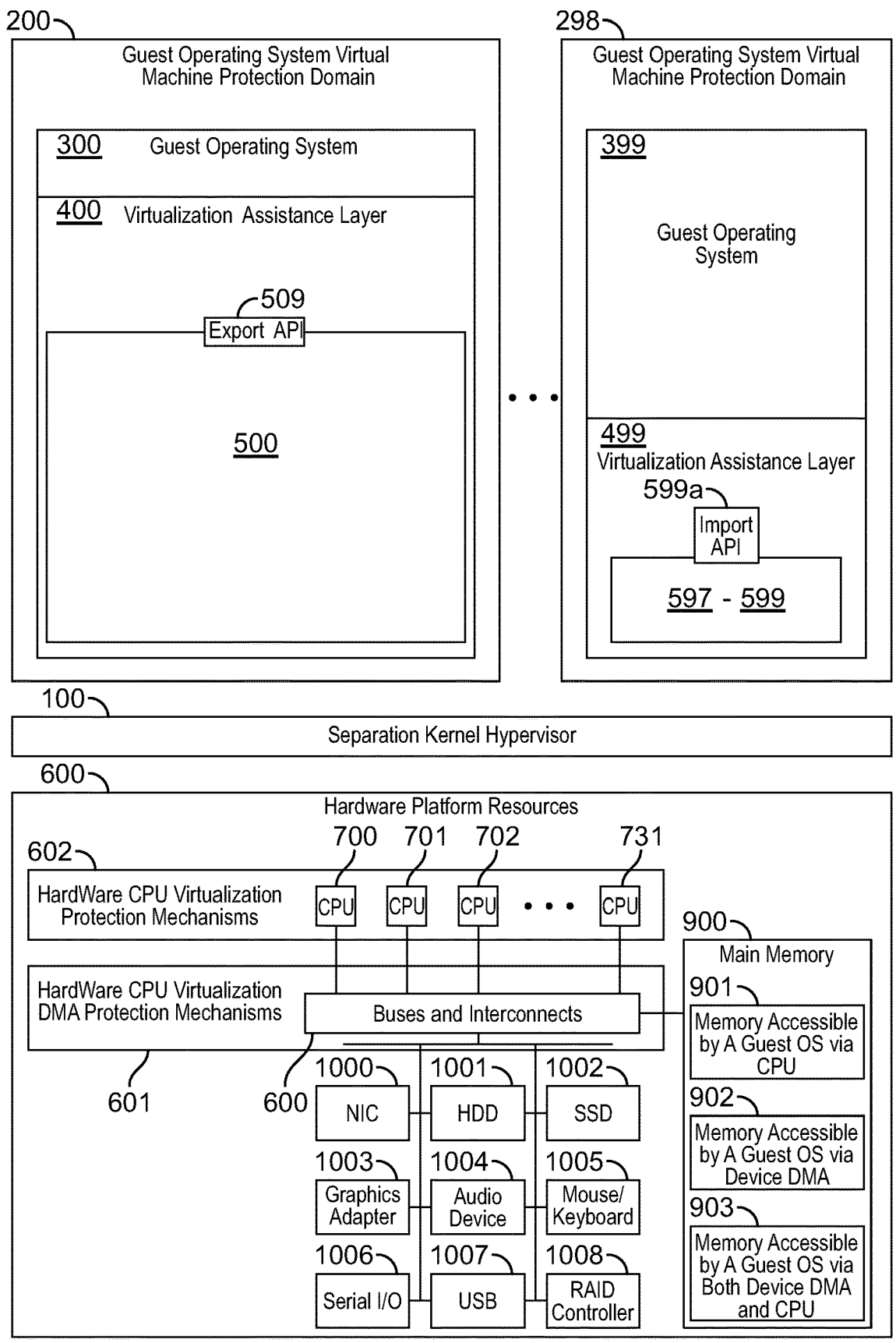
FIG. 5 is a block diagram illustrating an exemplary system and separation kernel hypervisor architecture consistent with certain aspects related to the innovations herein.

FIG. 5 is a block diagram illustrating an exemplary system and separation kernel hypervisor architecture consistent with certain aspects related to the innovations herein. FIG. 5 shows an illustrative implementation as may be associated with FIG. 2, FIG. 3, and/or FIG. 4, where various VAL mechanisms, which may be within the virtualization assistance layer, may include the various monitoring and presentation mechanisms such as query monitor(s), instruction monitor(s), virtual hardware/device presentation mechanisms, etc. FIG. 5 also illustrates an import/export mechanism that may be used by a virtualization assistance layer and/or VAL mechanisms to communicate between themselves and other virtualization assistance layer and/or VAL mechanisms in other guest operating system virtual machine protection domains (subject to the security policies established, maintained, and enforced by the separation kernel hypervisor), in an isolated, secure, and even monitored fashion.

FIG. 5 illustrates mechanism and resources that may be used by the VAL mechanisms 500 to monitor a guest operating system 300. Such mechanisms and resources may include a memory monitor 501 and an instruction monitor 502.

The virtualization assistance layer 400 and/or the VAL mechanisms 500 may also use an export API 509 and/or an import API 599 (as may be configured and governed by the separation kernel hypervisor 100), in order to provide secure communication between a plurality of virtualization assistance layers (e.g., virtualization assistance layers 400 to 499) and/or a plurality of VAL mechanisms (e.g., VAL mechanisms 500 to 599).

Innovations set forth below, as also described in additional detail elsewhere herein via notation to the reference numerals in the description below, reside around various combinations, sub-combinations and/or interrelated functionality of the following features and/or aspects: (i) a separation kernel hypervisor that ensures the isolation of multiple guest Operating Systems each in its own Virtual Machine (VM); (ii) a virtualization assistance layer of software that runs within the same protection domain as the guest Virtual Machine, but is not directly accessible by the guest; (iii) a virtualization assistance layer as in (ii) that implements a virtual motherboard containing a virtual CPU and virtual devices such as disk controllers, USB controllers, keyboard, mouse, and serial interfaces; (iv) a mechanism within the VAL that returns results similar to physical hardware for configuration queries to the virtual controllers; (v) a mechanism within the VAL to vary the location of non-standard, private I/O devices at guest startup time; (vi) a mechanism within the VAL to vary the location and size of non-standard, private memory areas at guest startup time; and/or (vii) a mechanism within the hypervisor to vary the results of execution of CPU identification instructions in the processor according to configuration data for the hypervisor.

Systems and mechanisms, and example embodiments, of the VAL mechanisms 500 may include:

1. Monitoring of CPU (and CPU cache based) guest OS virtual device access (originated from a plurality of resources available to the guest operating system 300 (e.g., in FIGS. 3 and 4, etc), as directed by execution and resources (shown in FIG. 3) within the guest OS 300. For virtual devices assigned to the guest OS 300, the separation kernel hypervisor 100 may trap and perform the processing herein regarding access to such device(s), and then pass associated data regarding that trap to the virtualization assistance layer 400. The virtualization assistance layer 400 may then pass the associated data of that trap to the VAL mechanisms 500.

The monitoring of guest operating system 300 virtual device access, includes, but is not limited to, constructs in guest operating system 300 devices which may have semantics specific to a specific hardware architecture. For example, a virtualized Network Interface, a virtualized disk controller, or a virtualized interrupt controller, any of which may be probed by guest software intent on determining if it is running under a hypervisor.

The monitoring of guest operating system 300 device access includes, but is not limited to, constructs in guest operating system 300 devices (including the resources shown in FIGS. 3 and 4) which may have semantics specific to the implementation of a particular separation kernel hypervisor.

For all such attempts by the Guest Operating System 300, the Separation Kernel Hypervisor 100 (when configured to do so) may trap such access attempts, then pass associated data of that trap to the virtualization assistance layer 400 and/or VAL mechanisms 500.

Figure 6:
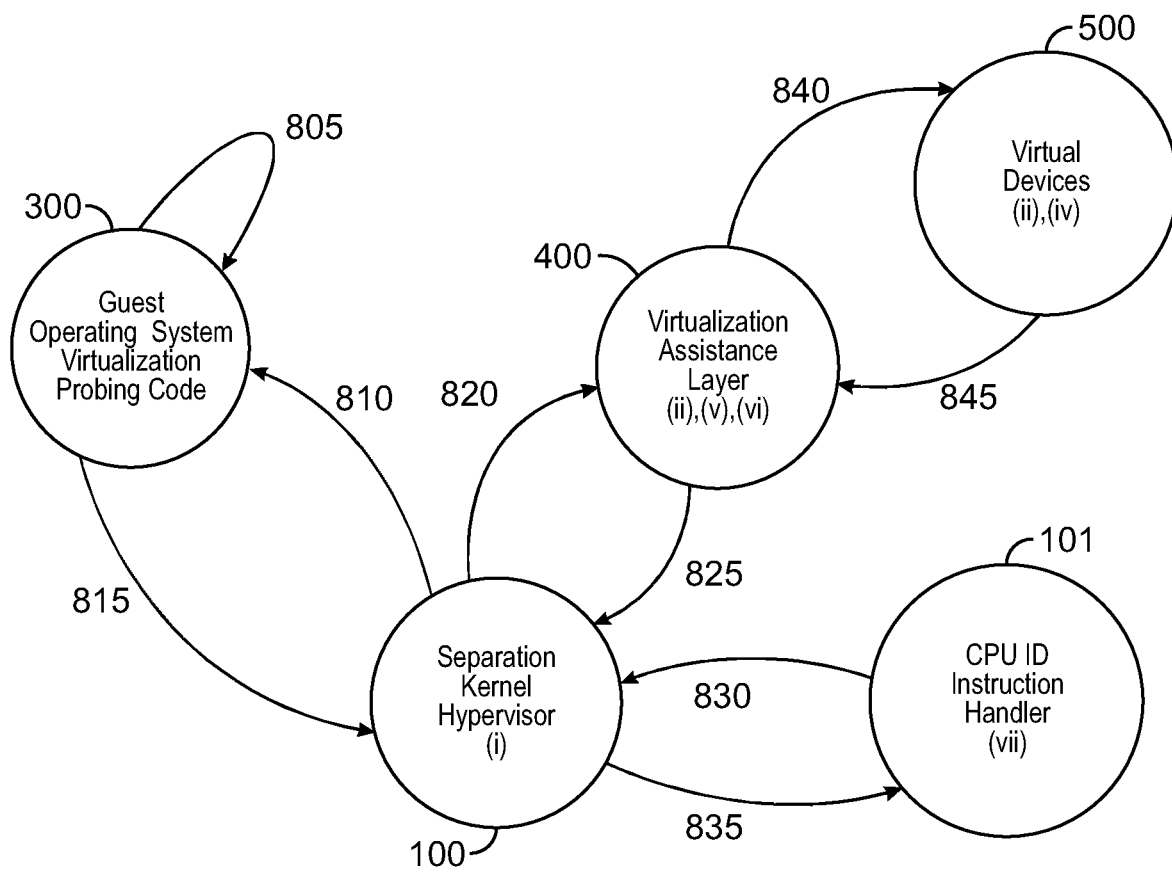
FIG. 6 is a representative sequence diagram illustrating exemplary systems, methods, and Separation Kernel Hypervisor processing/architecture consistent with certain aspects related to the innovations herein.
Figure 7:
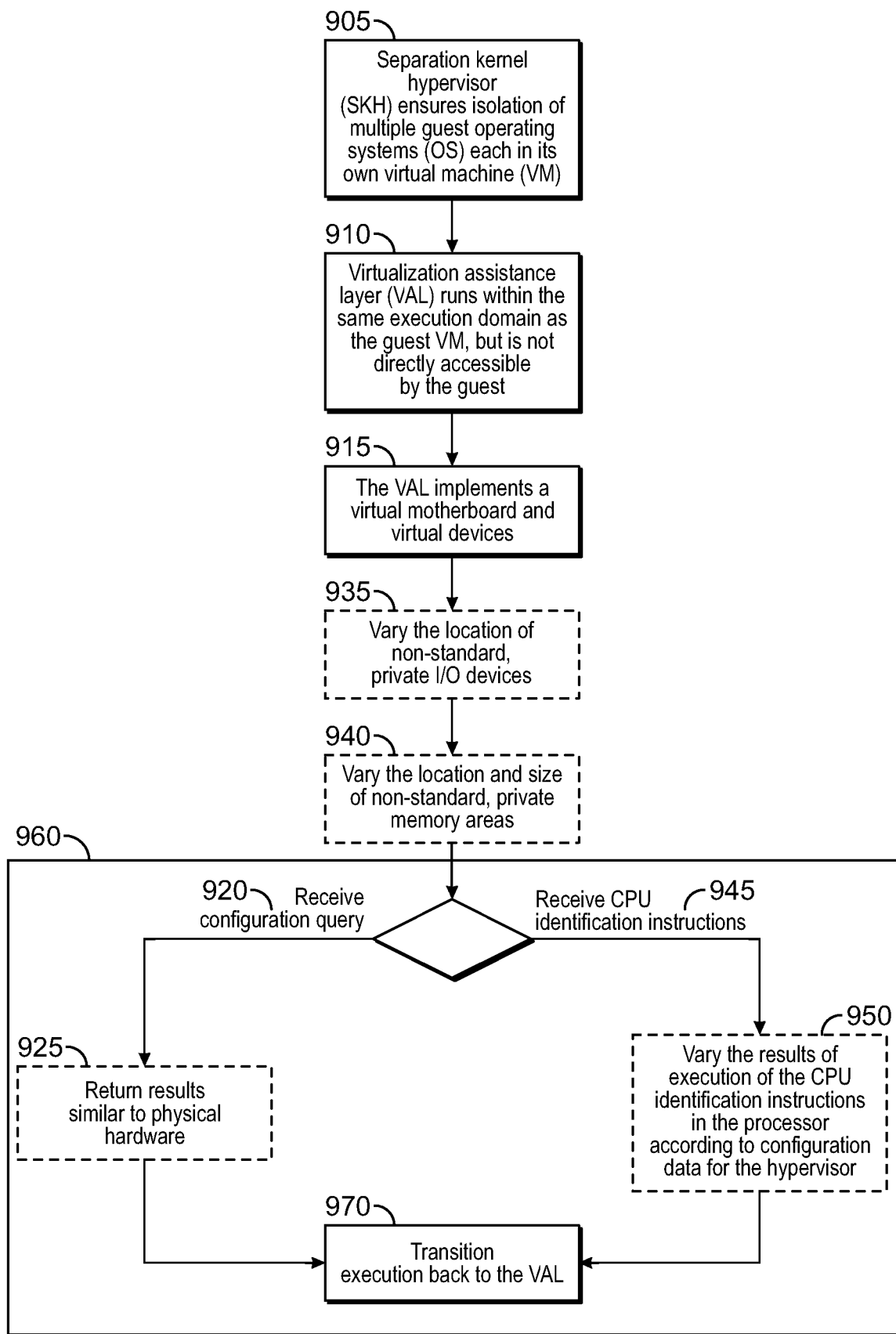
FIG. 7 is a representative flow diagram illustrating exemplary systems, methods, and Separation Kernel Hypervisor processing/architecture consistent with certain aspects related to the innovations herein.

FIGS. 6 and 7 are representative sequence/flow diagrams illustrating exemplary systems, methods, and Separation Kernel Hypervisor processing/architecture consistent with certain aspects related to the innovations herein. FIGS. 6 and 7 relate, inter alia, to the guest operating system attempting to perform various fingerprinting operations such as: query or perform other processing in connection with virtual devices, perform processing in connection with non-standard, private I/O devices or memory areas at guest startup time, execute or otherwise process data in connection with the issuance of CPU identification instructions, etc.

Turning to the illustrative implementations/aspects of FIG. 6, at step 805, a Guest Operating System 300 processes a request related to virtualization probing code, such as configuration and/or identification queries pertaining to the virtual hardware environment. At step 815, the request is sent to the Separation Kernel Hypervisor SKH 100. The SKH 100 ensures the isolation of multiple guest Operating Systems each in its own Virtual Machine (VM) (step i). At step 820, the SKH 100 transitions execution to the Virtualization Assistance Layer 400. The SKH 100 processes instructions to execute a Virtualization Assistance Layer 400 that runs within the same protection domain as the Guest Virtual Machine, but which is not directly accessible by the guest (step ii). Further, according to some implementations at guest startup time, the VAL 400 may vary the location of non-standard, private I/O devices (step v) and/or vary the location and size of non-standard, private memory areas (step vi). Then, at 840, the VAL 400 may implement the virtual devices 500, e.g., a virtual motherboard including at least one virtual device such as a virtual CPU, a disk controller, a USB controller, keyboard, mouse and serial interface(s) (step iii). Next, for configuration queries to the virtual devices 500 at step (iv), the VAL returns results similar to physical hardware after transitioning execution from virtual devices 500 to VAL 400, at 845. Next, at step 825 the virtualization assistance layer transitions execution back to the Separation Kernel Hypervisor, or the Separation Kernel Hypervisor transitions execution from the virtualization assistance layer back to the Separation Kernel Hypervisor.

For a CPU identification instruction, the SKH 100 at step 835 transitions execution to a CPU Instruction Handler 101 that varies the results of execution of the CPU identification instructions in the processor according to configuration data for the hypervisor (step vii). At step 830, the results of the CPU identification instruction handler 101 is returned to the SKH 100. Further, in order to change the virtualized hardware environment presented to an operation system in various ways to prevent "fingerprinting", execution may cycle a multiple times between steps 805 through 845.

As explained above in connection with FIG. 6, the virtual machine platform presented to a guest in a hypervisor may be varied, or presented to such operating system in a specified manner, in order to prevent software running in the guest from discovering that it is being run under control of the hypervisor.

Turning to FIG. 7, such illustrative system or process begins at step 905 where a Separation Kernel Hypervisor ensures the isolation of multiple guest Operating Systems each in its own Virtual Machine (VM). Next, a Virtualization Assistance Layer of software is implemented, at 910, which runs within the same protection domain as the guest Virtual Machine, but is not directly accessible by the guest. The virtualization assistance layer then implements, at 915, a virtual motherboard containing a virtual CPU and virtual devices such as disk controllers, USB controllers, keyboard, mouse, and serial interfaces. Here, in some implementations at a guest startup time, the VAL may vary the location of non-standard, private I/O devices, at 935, and/or the VAL may vary the location and/or size of non-standard, private memory areas, at 940.

Processing then proceeds to a virtual hardware presentation phase 960, wherein one or more of a variety of virtual hardware presentation mechanisms and/or VAL mechanisms may optionally be included and/or utilized responsive to queries, instructions or other processing attempts from a monitored guest. For example, at step 920, a configuration query may be received regarding virtual device(s). Here, the VAL may then return results similar to physical hardware, at 925. Moreover, according to some implementations, upon receiving and executing CPU identification instructions in the processor, at 945, the hypervisor may vary the results of execution of CPU identification instructions in the processor according to configuration data for the hypervisor, at 950. Additional operations from the VAL may also be performed. After such operations and/or processing is performed, execution may then be transitioned back to the VAL, at 970.

The innovations and mechanisms herein may also provide or enable means by which software that attempts to detect that it is running under a hypervisor in order to prevent its detection by malware protection software, or otherwise change its behavior will instead run as it would without the hypervisor.

Implementations and Other Nuances

The innovations herein may be implemented via one or more components, systems, servers, appliances, other subcomponents, or distributed between such elements. When implemented as a system, such system may comprise, inter alia, components such as software modules, general-purpose CPU, RAM, etc. found in general-purpose computers, and/or FPGAs and/or ASICs found in more specialized computing devices. In implementations where the innovations reside on a server, such a server may comprise components such as CPU, RAM, etc. found in general-purpose computers.

Additionally, the innovations herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, appliances, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and other non-transitory media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Other non-transitory media may comprise computer readable instructions, data structures, program modules or other data embodying the functionality herein, in various non-transitory formats. Combinations of the any of the above are also included within the scope of computer readable media.

In the present description, the terms component, module, device, etc. may refer to any type of logical or functional circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer, to processing/graphics hardware, and the like. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., Silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media), though do not include transitory media such as carrier waves.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the inventions have been specifically described herein, it will be apparent to those skilled in the art to which the inventions pertain that variations and modifications of the various implementations shown and described herein may be made without departing from the spirit and scope of the inventions. Accordingly, it is intended that the inventions be limited only to the extent required by the applicable rules of law.

The invention claimed is:

1. A method for providing anti-fingerprinting mechanisms in a separation kernel hypervisor to improve computer security, the method comprising:
   partitioning hardware platform resources via a separation kernel hypervisor into a plurality of guest operating system virtual machine protection domains;
   executing the guest operating system virtual protection domains to provide a secure software execution environment wherein the domains are isolated from each other, wherein each of the domains includes a guest operating system, a virtualization assistance layer, and a detection mechanism;
   providing a virtualization assistance layer (VAL) including a virtual representation of the hardware platform in each of the guest operating system virtual machine protection domains such that the VAL security processing is not performed in the separation kernel hypervisor;
   transitioning, with a separation kernel hypervisor, an execution from a guest operating system to the virtualization assistance layer isolated from the guest operating system;
   transitioning, with the virtualization assistance layer, the execution to at least one virtualization assistance layer mechanism;
   implementing, via the virtualization assistance layer, a virtual motherboard containing a virtual CPU, one or more virtual devices, and one or more virtual controllers associated with each of the virtual devices;
   processing configuration queries directed to at least one virtual controller; and
   utilizing an I/O device mechanism within the VAL to vary, at guest startup time, location information of one or more private I/O devices and/or memory areas associated with non-native platform resources.

2. The method of 1, wherein the one or more virtual devices includes a disk controller, a network controller, a graphics controller, an audio controller, a USB controller, a keyboard, a mouse, and/or a serial interface.

3. The method of claim 1, wherein the one or more virtual devices comprises a disk controller, a network controller, a graphics controller, an audio controller, a USB controller, a keyboard, a mouse, and a serial interface.

4. The method of claim 1, further comprising:
   implementing a separation kernel hypervisor that ensures isolation of multiple guest operating systems, each guest operating system in its own virtual machine.

5. The method of claim 1, further comprising:
   implementing a virtualization assistance layer (VAL) of software that runs within the same protection domain as the guest virtual machine but is not directly accessible by the guest.

6. The method of claim 5, further comprising:
   executing one or more detection mechanisms while preventing interference or tampering with, or corruption or bypass of, the plurality of guest operating system virtual machine protection domains.

7. The method of claim 1, further comprising:
   implementing a virtualization assistance layer that implements a virtual motherboard containing a virtual CPU and memory.

8. The method of claim 1, further comprising:
   implementing at least one routine and/or component to prohibit the guest operating systems from tampering with, corrupting, and/or bypassing one or more detection mechanisms.

9. The method of claim 1, wherein:
   the plurality of guest operating system virtual machine protection domains includes corresponding guest operating systems; and
   wherein isolating the loss of security in one of the guest operating system virtual machine protection domains to the one lost security domain such that security is not broken in all the domains.

10. The method of claim 1, wherein:
    moving virtualization processing to the virtual hardware platforms within each guest operating system protection domain so that substantially all analysis and security testing is performed within each guest operating system protection domain such that the separation kernel hypervisor is of reduced size and/or complexity.

11. The method of claim 1, further comprising:
    detecting in each of the domains their own probing instruction as a function of the isolated domains;
    wherein viewing the virtual hardware platform within each domain as separate hardware by a guest is implemented such that bypass is prevented.

12. The method of claim 1, wherein one or more of detection mechanisms include a subcomponent and/or a subroutine configured for monitoring of guest operating system memory access.

13. The method of claim 1, wherein one or more detection mechanisms include one or more subcomponents and/or subroutines configured for monitoring actions of the guest operating system including observation, detection, and/or tracking of code, data, execution flow, and/or resource utilization at runtime.

14. The method of claim 1, further comprising:
executing one or more detection mechanisms while preventing interference, corruption, or tampering with, or bypass of, at least one of the plurality of guest operating system virtual machine protection domains.

15. The method of claim 1, further comprising:
enforcing policy for activities monitored by the detection mechanism within the guest operating system virtual machine protection domain.

16. The method of claim 1, wherein the virtualization assistance layer virtualizes portions of the hardware platform resources including a virtual CPU/ABI, a virtual chipset ABI, a set of virtual devices, a set of physical devices, and firmware exported to the corresponding guest operating system.

17. The method of claim 1, further comprising:
executing the detection mechanism while preventing interference, corruption or tampering with, or bypass of, at least one of the plurality of guest operating systems.

18. A method of providing computer security, comprising:
isolating, with a separation kernel hypervisor, a plurality of guest operating systems into a plurality of virtual machines, wherein each guest operating system is isolated into a virtual machine that is secure and separate from each other guest operating system;
for each virtual machine, implementing a virtualization assistance layer within a same protection domain as the virtual machine, wherein security processing of the virtualization assistance layer is not performed in the separation kernel hypervisor;
for each virtualization assistance layer, implementing, with the virtual assistance layer, a virtual motherboard comprising a virtual CPU and at least one virtual device;
varying, with the virtualization assistance layer, location information of at least one private I/0 device at a guest operating system startup time;
varying, with the virtualization assistance layer, location and/or a size information of at least one private memory area at the guest operating system startup time;
wherein the at least one private I/O device and the at least one private memory area are associated with non-native platform resources;
utilizing one or more of a plurality of virtual hardware presentation mechanisms and/or virtualization assistance layer mechanisms to provide the varied location(s) and/or size(s) information responsive to queries, instructions, or other processing attempts from at least one of the guest operating systems in a virtual hardware presentation phase; and
in the virtual hardware presentation phase:
receiving a configuration query regarding at least one virtual device and returning, with the virtualization assistance layer, results similar to physical hardware results;
receiving CPU identification instructions and executing the CPU identification instructions in the virtual CPU;
varying, with the hypervisor, results of execution of the CPU identification instructions in the CPU according to configuration data for the hypervisor and transitioning execution back to the virtualization assistance layer; and
performing, with the hypervisor, at least one additional operation from the virtualization assistance layer.

19. The method of claim 18, wherein the virtualization assistance layer is not directly accessible by the guest operating system in the same protection domain.

20. The method of claim 18, wherein the at least one virtual device comprises at least one of a virtual disk controller, a network controller, a graphics controller, an audio controller, a virtual USB controller, a virtual keyboard, a virtual mouse, and a virtual serial interface.

21. The method of claim 18 wherein the virtualization assistance layer is implemented via software that runs within the same protection domain as the guest virtual machine but is not directly accessible by the guest.

* * * * *